Sept. 29, 1964     J. R. JOHNSON     3,150,996
APPARATUS FOR FORMING CONTAINER COATING
Filed April 19, 1960     4 Sheets-Sheet 1

INVENTOR.
JOHN R. JOHNSON
BY
J. R. NELSON &
W. A. SCHAICH
ATTORNEYS

Sept. 29, 1964 J. R. JOHNSON 3,150,996
APPARATUS FOR FORMING CONTAINER COATING
Filed April 19, 1960 4 Sheets-Sheet 2

INVENTOR.
JOHN R. JOHNSON
BY J. R. NELSON &
W. A. SCHAICH
ATTORNEYS

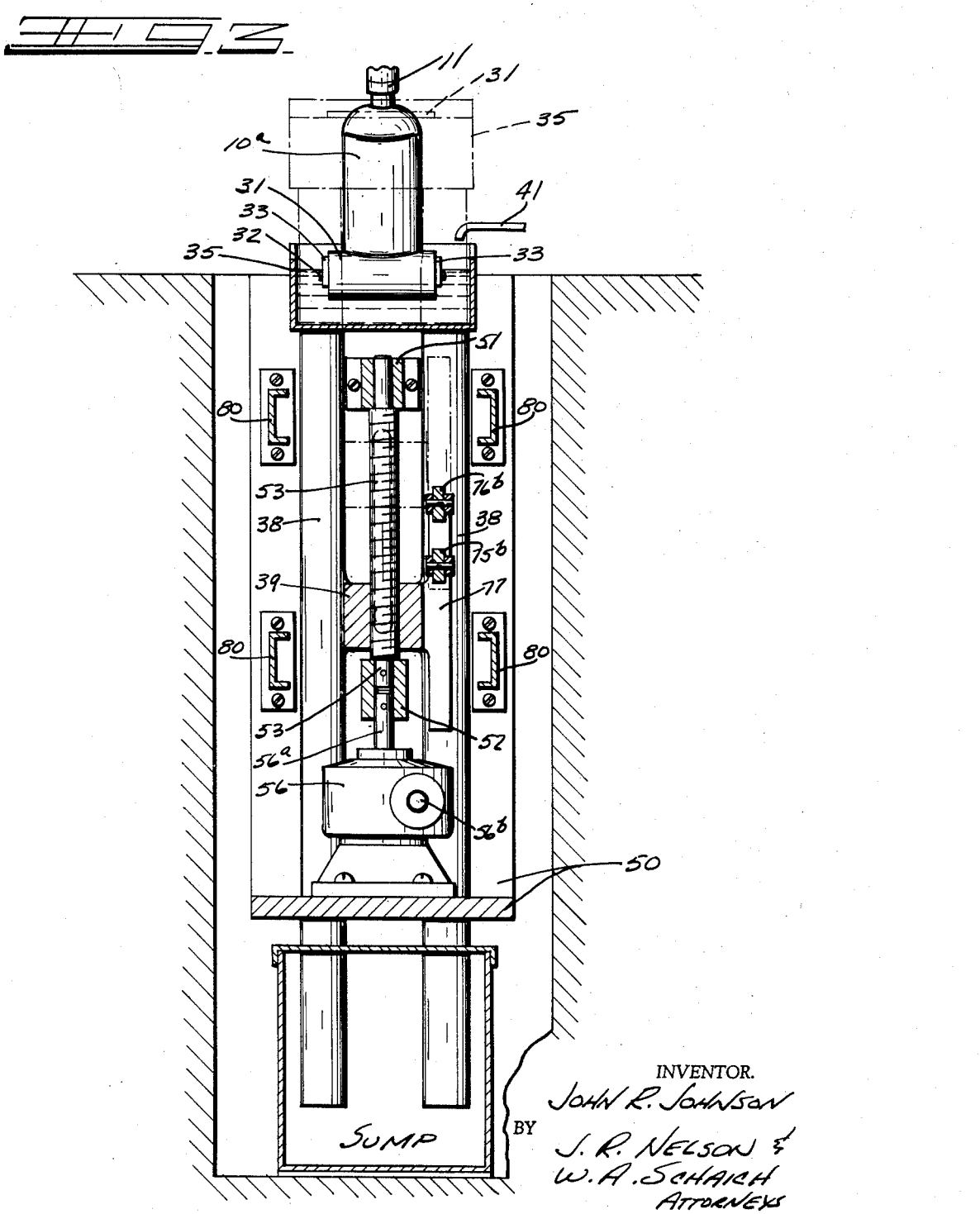

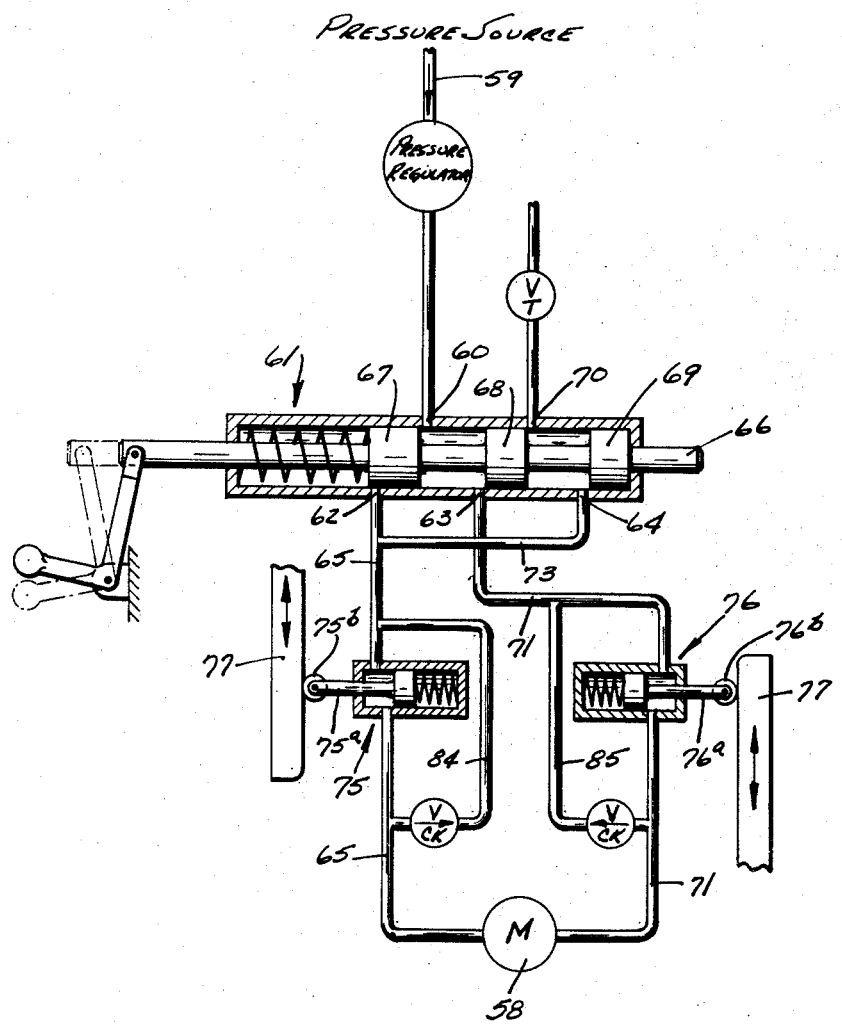

United States Patent Office 3,150,996
Patented Sept. 29, 1964

3,150,996
APPARATUS FOR FORMING CONTAINER
COATING
John R. Johnson, Toledo, Ohio, assignor to Owens-Illinois
Glass Company, a corporation of Ohio
Filed Apr. 19, 1960, Ser. No. 23,302
3 Claims. (Cl. 118—102)

The present invention relates to the art of forming a smooth, relatively thin, uniform coating on an article, such as a glass container, from an organic material applied to the article in liquid condition, and, more particularly, to the manipulations and means for forming such a coating free of any excess droplets or accumulations that normally appear at the lowermost surface of the article after the liquid form of the coating material is applied.

In a strict sense, and as a practical example, the invention is applied to a machine and process wherein virgin glass containers, such as empty glass bottles, are moved by a carriage through the steps of application of a primer, preheat of the bottle to dry the primer and elevate glass temperature, dipping the preheated bottle in a bath of liquid plastic in the nature of plastisol or organosol, removing the bottle from dipping and smoothing the coating and baking the coating to final form as a plastic envelope for a major portion of the glass container for ultimate use as a glass aerosol package. This machine and process is fully disclosed in a copending application, Serial No. 835,360, filed August 21, 1959, and now abandoned, in which I am a joint inventor and which is owned by a common assignee. The aerosol package formed under this process is set forth in the disclosure of another copending application of R. M. Smith and L. G. Wells, entitled, "Glass Aerosol Bottles and Method for Making Same," owned by this assignee, Serial No. 16,926, filed March 23, 1960, and now abandoned. At this point, it should be understood that the present invention has a wider variety of uses than may be made of it in connection with the just-outlined process. More specific mention of this will be set forth presently.

Nevertheless, in the outlined process, the virgin glass bottles have applied thereto a mixture of an amino alkyl ethoxy silane and a prepared mixture of an unesterified epoxy resin and an alkyl methacrylate polymer, and an organic solvent, such as methyl ethyl ketone. The viscosity of the foregoing mixture of materials is controlled closely within a desired viscosity range by a "viscorator," or automatic viscosity control. The exact, desirable viscosity will depend on the material used, of course, but, as an example, the above-mentioned primer is satisfactorily applied in a range of 10–20 centipoises. Also, the temperature of the materials is controlled closely to a desired working temperature by heat exchanges in the system. This material, then is in tanks, as will be described hereinafter, and the glass bottles are dipped therein to coat them with this mixture of organic coating material. As indicated, this material is quite fluid, and as the bottles are conveyed and lifted from the bath of material in the tank, the execss of the fluid coating material will flow downwardly on the bottle surface to a point of separation, and a flowing string of the material eventually breaks off to leave a droplet of the coating material at the lowermost surface of the bottle as a stalactitic formation. If this droplet remains through the heating step for conditioning the coated bottle prior to applying the plastic material, the plastic coating will accordingly be non-uniform, with the result that the plastic envelope will have a flaw. This flaw in the plastic envelope may be referred to as a "burn," which is a defective coat at the area where the excess droplet of the primer material appears.

This invention, therefore, has as one of its objects the provision of method and apparatus for elimination of such droplet of applied coating material, assuring a substantially uniform, smooth coating on the articles.

Another object of the invention is the provision for control over the thickness and continuity of the coating of an organic primer material on a siliceous surface preparatory to applying a plastic coating, and bonding same tenaceously thereon, so that "burn" areas or voids on any part of the plastic covering are eliminated.

As indicated earlier, the invention has further uses. In this, a broader sense, it may be applied for smoothing any form of coating applied as a covering of a surface portion of an article with a liquid material in flowable condition, whereon a droplet of the material may appear at a lower surface of the article. In the art, the handling of this problem of a droplet or "tear drop" has come to be referred to as "detearing." Certain forms of methods and apparatus have been developed for detearing coatings applied by dipping, spraying, etc. Some of these are rather complex in the form of their mechanisms, and, as applies to the machine of the aforementioned process of manufacture of a plastic coated glass aerosol, would further complicate the machine structure by their use. Others, such as the electrostatic process disclosed in U.S. Patents 2,359,476 and 2,640,459, are somewhat complex in their arrangement and are not easily adaptable to an operation of coating glass articles, which are essentially electric insulators. In the electrostatic process, the coated article is brought into spaced relationship with respect to a detearing electrode, there being established between it and the article, an electrical potential difference of high voltage. The resultant electrostatic field performs the detearing. The process requires that the coated article or coating serve as one electrode, and, thus, either is required to be a conductor. Glass articles, which are poor conductors, present a problem for such an operation and, therefore, the process is not altogether universal and flexible in its use. More important, however, is the fact that the voltages involved, being on the order of 80,000 to 100,000 volts, present a potential electric shock or spark hazard. The primer materials earlier mentioned are highly volatile, especially the ketone solvents and the like, so that is it dangerous to employ this process for removing such material.

It is, accordingly, another object of the invention to provide detearing method and apparatus that is practical, economical, simple, and safe for use in the manufacture of coated glass articles.

Another object of the invention is to provide method and apparatus for removal of accumulated excess primer material in a primed coating along the bottom surface of a coated article and not break the continuity of the coating in so doing.

Another object of the invention is to provide a type of mechanical detearing in a continuous article-coating machine process that is performed automatically as a part of the manufacture.

Still another object of the invention is to provide apparatus for rolling engagement with the lowermost surface of an article coated with a flowable material and apply a pressure thereto to absorb any excess material that flows to that surface, and, at the same time, wet the surface with a solvent material in liquid form to effect a smooth coating on that surface in continuity with the remainder of the coating on the article.

A further object of the invention is to provide an absorbent roller apparatus for engaging the under surface of a coated article to smooth the coating thereat as the coated article moves continuously on the machine carriage, the apparatus including an adjustment relative to the articles on the carriage and provided with automatic maximum and minimum stops for the adjustment, all of the foregoing being accomplished through spark-free fluid-pressure operated drives which are safe against explosion in operation near volatile materials.

Other objects and advantages of the invention will become apparent to those skilled in the art from the following detailed description, taken in conjunction with the annexed sheets of drawings, on which is presented for purposes of illustration only, a preferred embodiment of the invention.

In the drawings:

FIG. 3 is a sectional elevational view taken along line 3—3 on FIG. 2.

FIG. 4 is a schematic diagram having the fluid circuits of the control for adjusting the height of the detearing device.

Generally describing the method of the invention for attaining the foregoing objects, the articles are brought in succession to a place of application of the coating material, and brought to a generally upright attitude, and, after the coating is applied, the articles are maintained in that attitude to allow a substantial portion of the excess to run or drain from the article. It is axiomatic that after an article has had applied to it a coating of the liquid material, excess of the liquid material will, to a certain degree, separate from the article by flowing in a stream or string therefrom. While that coating on the article is still in flowable condition, a last portion of the excess material will accumulate in the form of a droplet or tear drop at the lowermost surface or edge of the article. The mentioned droplet or tear drop is removed by passing the article relative to a roller surface of an absorbent material such that the roller surface maintains rolling engagement along the lowermost surface of the article. This removes any excess of the material accumulated at that surface. Additionally, the absorbent roller surface is wetted with a liquid solvent so that if, at the time the roller passes over the mentioned under surface of the article, the coating material has attained a relatively non-flowable condition, the roller will apply a solvent on that surface to assure smoothing the coating and maintaining a continuity thereof on the article. The roller surface is held under positive engagement with the surface of the article so as to more or less squeeze any excess of the coating into the roller, and the absorbent roller, as mentioned, performs the wetting action on the coating to smooth and maintain uniformity and continuity of the coating as between all the surface of the article where the coating is applied.

Thereafter, should the nature of the coating material require curing, it is then ready for such curing or drying.

Since one of the primary uses made of the invention is in the formation of a suitable coating on glass bottles, of an organic primer material in the production of plastisol coated glass bottles from which a suitable glass aerosol package may be made, it will be particularly described in that connection. Therefore, as a practical illustration of the invention, a preferred embodiment, including a novel apparatus capable of performing the foregoing method, will now be described.

Figure 1:
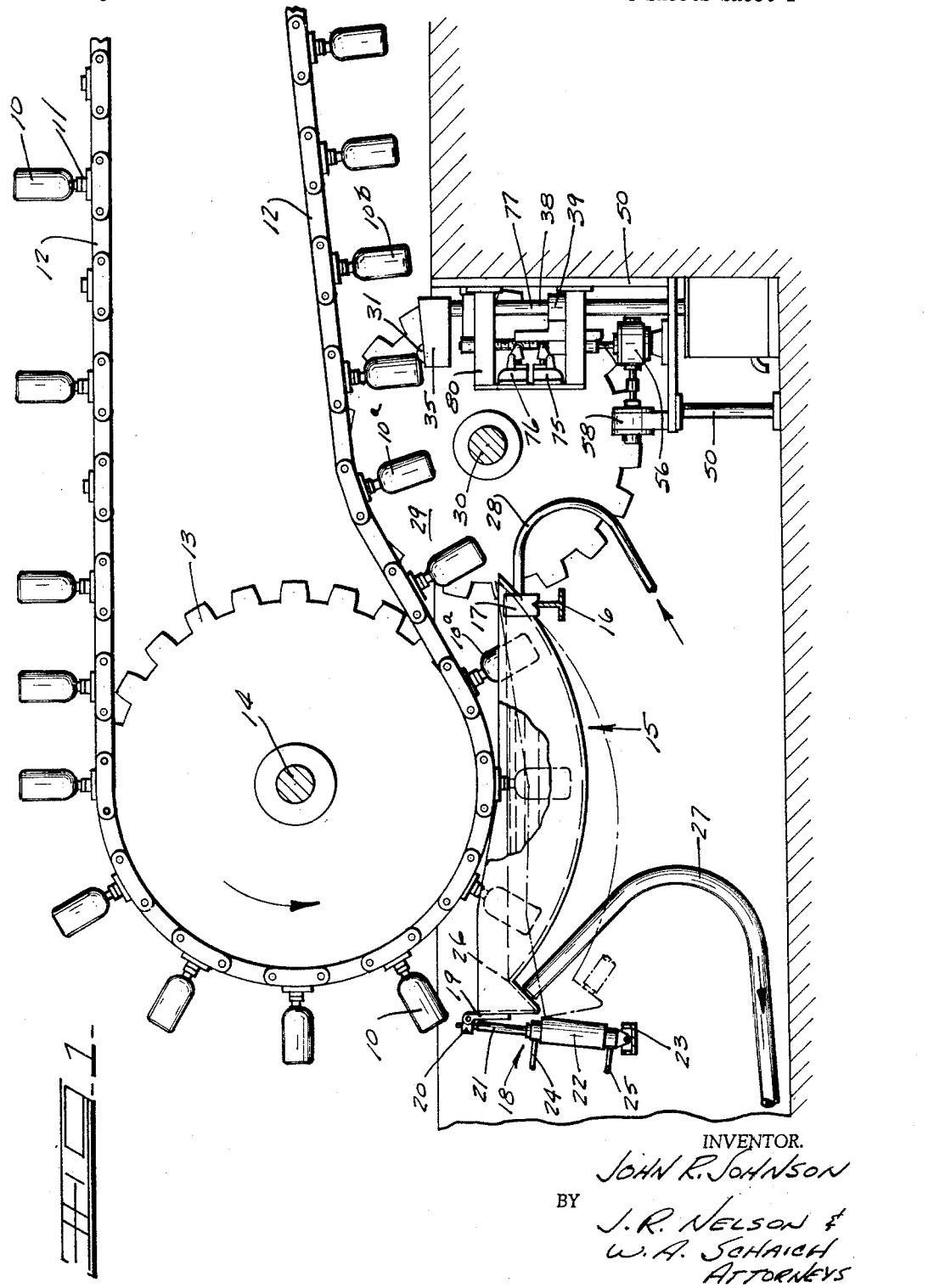
FIG. 1 is a partial sectional elevational view with parts broken away, showing the invention being employed in connection with a machine having utility for the manufacture of coated glass articles, wherein the portion of the machine illustrated provides for applying a liquid primer coating to the articles by dipping.

Referring to FIG. 1, a forward end section of the machine disclosed in the above-referred to abandoned application Serial No. 835,360 is shown for a single production line thereof. At the forward section of the machine, glass bottles 10 are loaded in inverted fashion to chucks 11 which are fastened to a carriage chain 12. The carriage chain is driven continuously through an endless path which reaches around a sprocket 13 keyed on a horizontal shaft 14. The drawings herein disclose, for the sake of simplicity of illustration, one line of holding chucks aligned successively along the chain 12 of the carriage means. Any number of lines may be constructed and accommodated by the carriage means, and, in fact, in actual practice, I have found that four lines of chucks are suitable on a machine, and eight lines on such a machine would be practical.

The just-described carriage means is movable continuously in one direction by any suitable drive means, such as an electric motor (not shown) connected to drive one of the horizontal shafts carrying sprockets engaging the chain. The drive is operated so that sprocket 13 will be driven in a counter-clockwise direction on FIG. 1, causing the chucked bottles 10 to be moved from left to right through a bath of organic primer material in dipping tank 15. Different primer materials may be employed in the machine process. One form of organic primer material utilized comprises a liquid mixture containing gamma-amino propyltriethoxy silane, epoxy resin, methyl methacrylate polymer and organic solvents, the ratio of the polymer to the resin being between 15:85 and 99:1, and the silane being present in an amount at least 0.05% by weight based on the combined solids content of the epoxy and methacrylate. The tank 15 is illustrated as being substantially semi-cylindrical. The tank is mounted at one end on a fulcrum 16 which is arranged as a suitable, rigid, stationary support. A pivot member 17 on the one end of the tank 15 cooperates with fulcrum 16 to form a suitable stationary pivot point for the tank. At the opposite end of the tank an adjustable support in the form of a cylinder motor 18 is connected at the bracket 19 by the collar 20 on the end of the piston rod 21. The cylinder 22 of the motor is pivotally attached to a rigid stationary channel member 23. Pressurized fluid is supplied appropriately to the cylinder 22 of the motor through the lines 24 and 25 by suitable valve control to make adjustment of the elevation of that end of the tank while its other end rests on the fulcrum 16. The tank 15 is constructed with an overflow ledge 26 which forms a spillway in the tank that is connected to a sump by line connection 27. The organic primer material, controlled as to proper viscosity and temperature by viscometer control and heat exchanger apparatus in a system (not shown) is supplied to the tank through inlet line 28. Thus, fresh primer material may be supplied to the tank and circulated in the system to retain the proper consistency, viscosity, and temperature of the bath. Since the horizontal shaft 14 is fixed in space, the level of the bath with relation to the bottles 10 being brought to immersion therein by the carriage may be regulated through the vertical adjustment of one end of the tank 15 by manipulation of the motor 18. As shown, the bottles 10 are thus brought to a substantially upright position and fully immersed in the bath to the desired elevation on the bottles for applying the coating of the primer material through dipping. As the carriage moves the bottles along its fixed path, coated bottles, as 10a, are removed from the bath of the primer material and elevated by the chain 12 running over the idler sprocket 29 rotatably mounted in a fixed position by horizontal shaft 30. As the chain 12 progresses over the sprocket 29, the bottles are thus elevated and brought to a substantially upright position at a place spaced from the place of applying the primer material. At this last-mentioned place, any excess of the material applied to the bottle in the dipping application will have run to and dripped from the bottle's lower surface, and any excess droplet cohering at that surface will have been formed.

Figure 2:
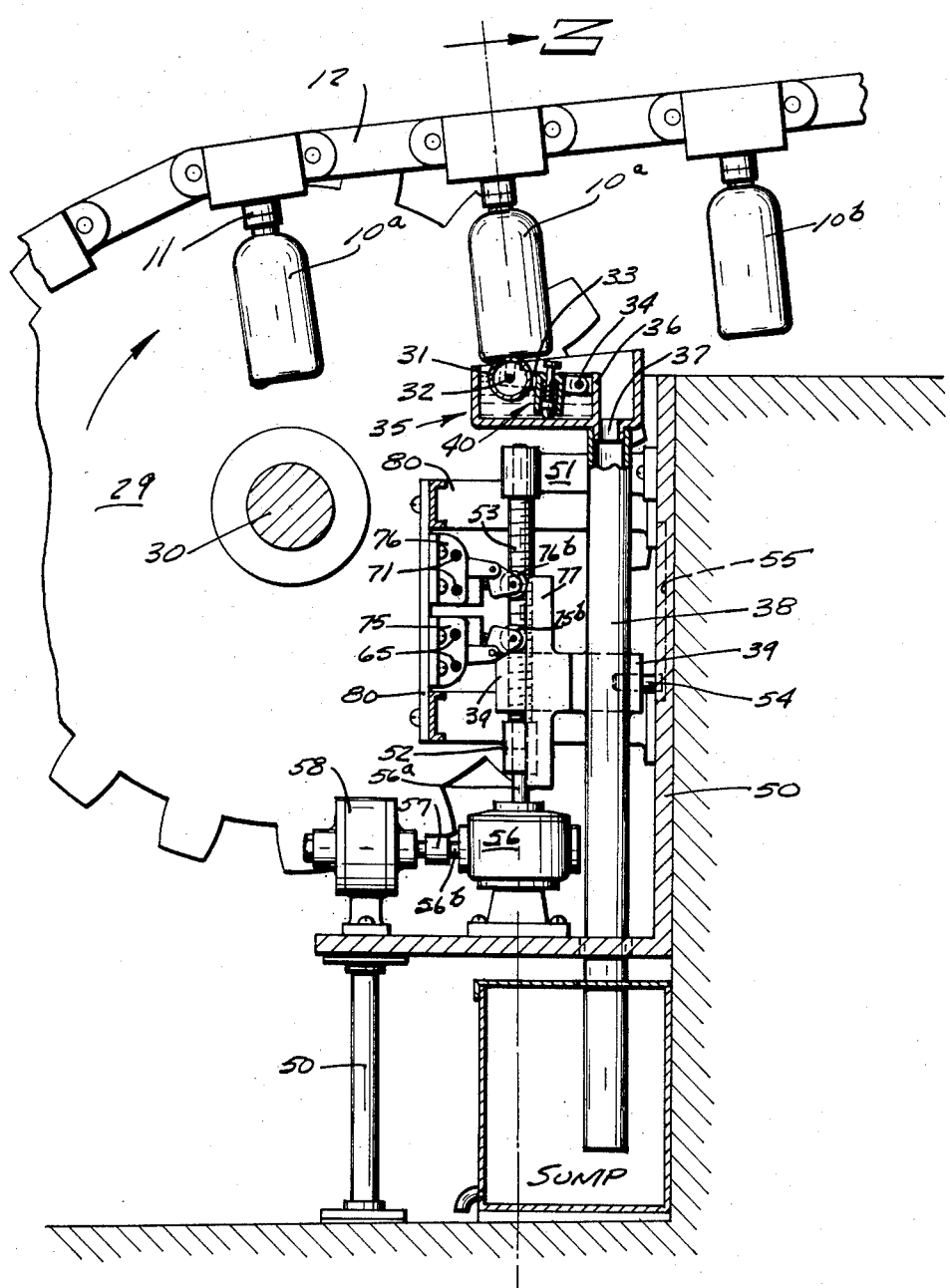
FIG. 2 is a more detailed sectional elevational view of a portion of FIG. 1, showing the operation of the novel detearing apparatus, and illustrates performance of detearing by the method of the invention in use on the mentioned machine in treating the primer coating applied at the bottom surface of a glass bottle.

As may be seen on FIGS. 2 and 3, a roller member 31 is mounted for free rotation about its axis by a shaft 32 mounted near its opposite ends in a yoked mounting member 33. The opposite end of the mounting member 33 is pivotally connected at a pin 34 on a bracket on the inner wall of a receptacle 35. The roller member 31 is constructed to have a center or core and a porous, absorbent peripheral layer. A material, as an example, which is satisfactorily employed under the presently described embodiment of the invention is a pile fabric of a soft textile material, such as may be composed of "Dacron," lamb's wool, or the like. Other porous, absorbent peripheral layers for the roller member may be substituted satisfactorily. The receptacle 35 forms a reservoir for an organic solvent material, such as a methyl ethyl ketone, which is supplied thereto from a source through a pipe 41. The level of the solvent is maintained constant within the reservoir by the facility of an overflow dam 36 formed by a transverse, vertically upstanding wall at one end of the reservoir. Adjacent the overflow dam 36 is an overflow outlet 37 communicating with a pair of upstanding pipes 38. These pipes 38 are integrally connected with an internal web casting 39, and, as such, form a vertical pedestal support for the just-described reservoir 35 and its attached parts 33 and 31.

Returning for the moment to the description of the roller member 31, it is positioned in spaced relationship to the lower surface of the coated bottles 10a so that, as each of the bottles is brought by the carriage past the place of roller 31, the roller will be positioned for making a rolling engagement with the underside of the bottles. This is accomplished by the yieldable means carried on the mounting member 33 in the form of an adjustable spring member 40. Thus, as the roller and bottle initially make engagement at the leading lower edge of bottle 10a, the continued movement of the bottle will depress the spring to cause the roller to roll along the underside of the bottle. The compression of the spring of the yieldable means 40 will assert a positive upward force of the roller against the bottle to assure that the roller will roll along that surface. During this rolling action, the periphery of the roller is continuously wetted by the solvent in the reservoir due to the roller being at all times partially immersed therein. The solvent on the roller is sufficient to wet the engaged surface of the bottle, and, at the same time, excess primer is absorbed into the roller. Also, the washing or wetting action of the roller on the coating smooths the portion it rolls on, and a completed thin, substantially uniform, smooth coating is on the bottle as it appears at 10b, FIG. 1.

The mentioned vertical pedestal means for supporting the roller assembly and reservoir is adjustably mounted on a rigid frame 50 such that the height of the roller may be adjusted with respect to operating on various sizes of bottles being run on the carriage. A horizontal bracket 51 attached to frame 50 provides an end journal mounting for a vertical screw 53 which serves as a driving element movable in opposite directions of rotation. The screw 53 has a threaded engagement with threads in the web 39 of the vertical pedestal. At the opposite side of web 39 is a guide pin 54 that rides in a vertical guide slot 55 in a vertical member of frame 50. The lower end of screw 53 is connected by a coupling 52 with the output shaft 56a of a geared reduction unit 56 mounted on a horizontal member of the frame 50. The input shaft 56b of the geared reduction unit 56 is connected by a coupling 57 to the shaft of fluid-operated motor 58. Motor 58 is a fluid-operated motor of the rotary type and is likewise mounted on the horizontal member of the frame 50.

Referring to FIG. 4, the control for the motor 58 will now be described. Fluid under pressure is supplied from a source to a pressure regulator by fluid connection 59, and then to the inlet 60 of a manually operated four-way valve 61. The valve has an exhaust outlet 70. The valve has ports 62, 63, and 64 in its housing opposite its inlet 60. A fluid connection is made between port 62 and one side of motor 58 by fluid line 65. Another fluid connection extends between port 63 and the other side of motor 58 by fluid line 71. The valve spool 66 of valve 61 has lands 67, 68, and 69 arranged for connecting pressure fluid from inlet 60 to either of ports 62 or 63, and, at the same time, respectively connecting either of ports 63 or 64 with exhaust outlet 70. The valve 61 also has a neutral or hold setting for stopping motor 58. As shown on FIG. 4, as the valve spool 66 is set by its lever to the position shown, inlet 60 is connected with port 63 through the space between lands 67 and 68. This connects pressure fluid to line 71 to one side of motor 58 to run it in one direction of rotation. Fluid is exhausted from the motor through line 65. A line 73 is T-connected between line 65 and port 64 of the valve. Thus, the exhaust fluid is transmitted through line 73, port 64, and to exhaust outlet 70 in the space between lands 68 and 69 of the valve. An adjustable throttle valve 74 is connected in the exhaust line 70 which may be regulated to adjust the speed of the motor 58. Likewise, speed may be regulated at the pressure regulator on the inlet side. By shifting the valve spool to the left on FIG. 4, lands 67 and 68 may be made to block both ports 62 and 63, thus disconnecting the motor from the pressure source. This is the neutral or hold position. Further movement of the valve spool to the left will connect inlet 60 with port 62 and supply pressure fluid through line 65 to motor 58 for reversing the latter. Exhaust fluid flows through line 71 to port 63 and exhaust outlet 70.

A normally closed valve 75 is connected in line 65, and a similar valve 76 is connected in line 71 of the described control system. These valves are spring set to close their respective fluid lines and are opened by actuation of their plungers through rods 75a and 76a that are cam-operated. The rollers 75b and 76b on these rods are arranged to roll on a cam surface 77, and, by so doing, the valves 75 and 76 are opened.

Referring for the moment to FIGS. 2 and 3, a cam 77, designed to a suitable length to define the length of movement between the maximum raised position and maximum lowered position of the roller member 31 assembly, is rigidly attached to web 39 for movement vertically therewith. The valves 75 and 76 are mounted stationary on framework 80 so that their rollers 75b and 76b may run on the cam 77 during the latter's vertical movements relative to these rollers. The upper and lower ends of cam 77 are tapered to allow for the rollers 75b and 76b to roll on and off the cam at the respective ends of the latter.

The above-described control arrangement for adjusting the rollers' elevation to meet with requirements of the bottles being carried on the carriage provides for automatic shut-off means to define maximum raised and maximum lowered positions of the roller assembly. This operates as follows. In the one instance, assume that the valve 61 is manually operated to run motor 58 for raising the pedestal and roller assembly from a point intermediate the mentioned maximum positions. Both rollers 75b and 76b will then be on cam 77, and valves 75 and 76 will be open. Thus lines 65 and 71 to the motor will be open and the motor will run accordingly as the valve 61 is operated. At the time the assembly is raised to the maximum raised position for roller 31, the roller 75b of valve 75 will run off the lower end of cam 77, which was moved vertically upward with the assembly by the motor drive. Valve 75 will then assume a closed position and block flow of fluid in line 65, which will stop motor 58. This is the maximum raised position for the roller 31.

Referring again to FIG. 4, by-pass fluid connections 84 and 85 are provided, respectively, in lines 65 and 71, which by-pass their respective valves 75 and 76. Each of these by-pass connections 84 and 85 has a one-way check valve in the line permitting fluid flow only in a direction from motor 58 to valve 61. Returning again to the above instance, since the motor was stopped due to the valve 75 being closed, the motor may now be reversed for moving the assembly downwardly. Thus, fluid under pressure is connected to line 71, and, since valve 75 is closed, the exhaust fluid from the motor will flow in by-pass connection 84 through its check valve, then, to port 64 and outlet 70 of valve 61. This will run the drive to move cam 77 downwardly to the point where valve 75 is again opened by its roller 75b running on the lower end of the cam. Thereafter, exhaust of the motor is handled by line 65. If the maximum lowered position for the assembly is reached, the valve 76 will be closed by its roller 76b running off the upper end of cam 77, and motor 58 will stop. This is the maximum lowered position for the roller 31. The motor may then be reversed, and, accordingly, the exhaust of the motor, since it cannot flow through the line 71, will flow in by-pass connection 85 through that check valve and to port 63 and outlet 70 until the roller 76b again runs on cam 77, whereupon, the exhaust may be handled by line 71.

Intermediate positions for the roller 31 between the mentioned maximum positions thereof may be selected by hand operation of valve 61.

The just-described system presents a safe, spark-free drive system for adjusting the apparatus during machine operation.

In connection with the above description of the invention, the described treatment of the bottle for applying a coating of liquid primer thereto, illustrated by dipping, is followed in sequence by subjecting the bottle to the detearing method of this invention, this method being performed by the presently described novel form of apparatus. It should be understood that various other forms of apparatus could adequately perform the method, once it is disclosed, or, even though it would be less convenient, the method could be performed by hand manipulation. It should also be understood that the present detearing method will be practical and operate with like satisfaction, regardless of the manner by which the coating of the liquid material is applied to the article. In this respect, the method will detear articles coated by spraying, flooding, etc., as well as by the illustrated dipping technique.

It will, of course, be understood that various details may be modified through a wide range without departing from the principles of this invention, and it is, therefore, not the purpose to limit the patent granted hereon otherwise than necessitated by the scope of the appended claims.

I claim:

1. In an article coating machine for applying an exterior coating of a liquid material, said machine having a continuous carriage traveling in a fixed path and means thereon for holding the articles depending therefrom, the combination of a tank containing said liquid material, means mounting said tank at a dipping station along the carriage, the level of the liquid being spaced from the carriage to define the elevation of coating upon immersion of the articles, a roller member having a peripheral absorbent surface, a member mounting said roller for free rotation about its axis, means pivotally supporting said member for maintaining the roller axis transversely of the path of travel of the carriage in spaced relation therewith comprising a rigid support, a vertically movable pedestal carrying said mounting member, a rotatable driving element on said rigid support, a bracket attached to said pedestal and connected to said driving element for raising and lowering the pedestal, a reversible fluid-operated motor connected to rotate the driving element, a source of fluid under pressure, a manually operated control valve having an exhaust port, an inlet fluid connection from the source to said valve, operating fluid connections from said valve, the latter being operable for connecting alternatively said inlet and one of said operating connections, and the other of said operating connections and said exhaust, automatic shut-off means comprising a normally-closed valve in each of said operating connections including an actuator, cam means movable relative to the actuators and cooperating therewith for defining maximum raised and lowered positions of the roller, whereby both normally closed valves are maintained open during movement of the roller between said maximum positions, one of the normally closed valves being closed at either of said maximum positions, and a yieldable means connected with said mounting member normally maintaining said roller disposed in the path of articles on said carriage for engagement with the articles, the roller, upon such engagement, rolling freely along the surface of said articles under biasing pressure of said pivotally supporting means.

2. The combination defined in claim 1 wherein is included a fluid connection with each of said fluid operating connections that by-pass the normally closed valve therein, each of the by-pass connections including a check valve permitting fluid flow from the motor to the control valve only, enabling reversal of the motor upon attainment of either of said maximum positions of the roller member.

3. In an article coating machine for applying a coating of a liquid form of material on the exterior of a hollow glass article, said machine having a continuous carriage traveling in a fixed path and means thereon for holding the articles depending therefrom, the combination of a tank containing said liquid material, means mounting said tank at a dipping station along the carriage such that the level of the liquid therein is spaced a given distance from the carriage to define the elevation of applying the coating upon immersion of the articles, a roller member provided with an outer peripheral surface of absorbent material, a mounting member for said roller providing for free rotation of the roller about its axis, means pivotally supporting the mounting member arranged for maintaining the roller axis transversely of the path of travel of the carriage in spaced relation in the path of the carriage and beyond said tank, a rigid support, a vertically movable pedestal, means connecting said pedestal and said mounting member, a driving element on said rigid support rotatable in opposite directions, a bracket attached to said pedestal and connected to said driving element for raising and lowering the pedestal, motor means connected to move the driving element, control means for said motor means including automatic shut-off for the motor means upon attainment of either maximum raised or maximum lowered positions of the roller member, and a yieldable means connected with said mounting member normally maintaining said roller disposed in the path of articles on said carriage for engagement with the articles.

References Cited in the file of this patent

UNITED STATES PATENTS

| | | |
|---|---|---|
| 948,012 | Goldsmith | Feb. 1, 1910 |
| 2,411,042 | King et al. | Nov. 12, 1946 |
| 2,413,144 | King | Dec. 24, 1946 |
| 2,444,144 | Ransburg | June 29, 1948 |
| 2,483,424 | Martines | Oct. 4, 1949 |
| 2,539,988 | Calles et al. | Jan. 30, 1951 |
| 2,554,803 | Wysocki | May 29, 1951 |
| 2,622,557 | Marcantel | Dec. 23, 1952 |
| 2,660,148 | Fogg | Nov. 24, 1953 |
| 2,821,491 | Fleming | Jan. 28, 1958 |
| 2,839,025 | Burke et al. | June 17, 1958 |
| 2,981,639 | Kachele | Apr. 25, 1961 |
| 3,028,260 | McKee | Apr. 3, 1962 |

FOREIGN PATENTS

| | | |
|---|---|---|
| 460,996 | Canada | Nov. 15, 1949 |
| P 11,450 | Germany | Nov. 15, 1956 |